United States Patent
Han et al.

(10) Patent No.: US 11,172,432 B2
(45) Date of Patent: Nov. 9, 2021

(54) CELL BAR METHOD AND APPARATUS

(71) Applicant: Lenovo (Beijing) Limited, Beijing (CN)

(72) Inventors: Jing Han, Beijing (CN); Lianhai Wu, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 48 days.

(21) Appl. No.: 16/639,908

(22) PCT Filed: Aug. 18, 2017

(86) PCT No.: PCT/CN2017/098164
§ 371 (c)(1),
(2) Date: Feb. 18, 2020

(87) PCT Pub. No.: WO2019/033433
PCT Pub. Date: Feb. 21, 2019

(65) Prior Publication Data
US 2021/0144626 A1    May 13, 2021

(51) Int. Cl.
*H04W 4/00* (2018.01)
*H04W 48/12* (2009.01)
(Continued)

(52) U.S. Cl.
CPC .......... *H04W 48/12* (2013.01); *H04B 17/318* (2015.01); *H04L 1/1614* (2013.01);
(Continued)

(58) Field of Classification Search
None
See application file for complete search history.

(56) References Cited

U.S. PATENT DOCUMENTS

2001/0032103 A1* 10/2001 Sinex ................. G06Q 10/06
705/4
2007/0258417 A1* 11/2007 Harvey .............. H04B 7/18506
370/338
(Continued)

FOREIGN PATENT DOCUMENTS

CN    1268857 A    10/2000
CN    101325787 A    12/2008
(Continued)

OTHER PUBLICATIONS

PCT/CN2017/098164, "International Search Report of the International Searching Authority", PCT International Searching Authority, dated Apr. 8, 2018, pp. 1-4.
(Continued)

*Primary Examiner* — Elisabeth Benoit Magloire
(74) *Attorney, Agent, or Firm* — Kunzler Bean & Adamson (57) ABSTRACT

The present disclosure relates to methods and apparatuses. According to an embodiment of the disclosure, a method includes: determining whether a cell supports aerial service; broadcasting conventional cell bar parameters associated with the cell; and broadcasting aerial cell bar parameters associated with the cell when the cell supports aerial service. Embodiments of the disclosure solve the technical problem concerning aerial cell bar, and thus can facilitate introducing aerial UEs into wireless networks.

22 Claims, 5 Drawing Sheets

(51) Int. Cl.
*H04B 17/318* (2015.01)
*H04L 1/16* (2006.01)
*H04W 48/04* (2009.01)
*H04W 48/16* (2009.01)
*H04W 84/06* (2009.01)

(52) U.S. Cl.
CPC ............ *H04W 48/04* (2013.01); *H04W 48/16* (2013.01); *H04W 84/06* (2013.01)

(56) References Cited

U.S. PATENT DOCUMENTS

| | | | |
|---|---|---|---|
| 2013/0336174 | A1 | 12/2013 | Rubin et al. |
| 2016/0119845 | A1* | 4/2016 | Lu ........................... H04L 67/12 370/331 |
| 2016/0142880 | A1* | 5/2016 | Talluri .................... H04W 4/06 455/456.1 |
| 2016/0309346 | A1* | 10/2016 | Priest .................... B64C 39/024 |
| 2017/0057634 | A1* | 3/2017 | Hunt ...................... H04W 4/021 |
| 2017/0127332 | A1* | 5/2017 | Axmon ................. H04W 36/32 |
| 2017/0168480 | A1* | 6/2017 | Wanstedt ............. G08G 5/0069 |
| 2017/0222712 | A1* | 8/2017 | Chang .................. H04B 7/18504 |
| 2018/0120091 | A1* | 5/2018 | Viollet ................... A63H 27/12 |
| 2018/0120829 | A1* | 5/2018 | Price ....................... B64C 27/20 |
| 2019/0139421 | A1* | 5/2019 | Nilsson ................. G05D 1/106 |
| 2019/0155312 | A1* | 5/2019 | Tam ................. H04B 7/18506 |
| 2019/0259287 | A1* | 8/2019 | Mustafic ............... H04W 36/08 |
| 2019/0327712 | A1* | 10/2019 | Moradi ................ H04B 1/7097 |
| 2020/0105151 | A1* | 4/2020 | Mahkonen ............. H04W 4/42 |
| 2020/0196245 | A1* | 6/2020 | Chen .................... H04W 52/36 |
| 2020/0372806 | A1* | 11/2020 | Wang .................... G01S 5/0027 |
| 2021/0051595 | A1* | 2/2021 | Rico Alvarino .... H04W 52/281 |

FOREIGN PATENT DOCUMENTS

| | | |
|---|---|---|
| CN | 102892178 A | 1/2013 |
| CN | 103096425 A | 5/2013 |
| CN | 103650374 A | 3/2014 |
| CN | 105554857 A | 5/2016 |
| CN | 106910376 A | 6/2017 |
| KR | 101409188 B1 | 7/2014 |

OTHER PUBLICATIONS

PCT/CN2017/098164, "Written Opinion of the International Searching Authority", PCT International Searching Authority, dated May 3, 2018, pp. 1-3.
Sony, "Barring Indication in MIB", R2-1706624, 3GPP TSG RAN WG2#NR_AdHoc#2, Jun. 27-29, 2017, pp. 1-2.
NTT Docomo, "Revision of SID on Enhanced Support for Aerial Vehicles", RP-171050, 3GPP TSG RAN Meeting #76, Jun. 5-8, 2017, pp. 1-4.
Kyocera, "Considerations for cell selection and reselection with UAVs", R2-1709520, 3GPP TSG-RAN WG2 #99, Aug. 21-25, 2017, pp. 1-2.
Nokia, "Potential mobility issues for air-borne UEs", R2-1704321, 3GPP TSG-RAN WG2 Meeting #98, May 15-19, 2017, pp. 1-4.
Ericsson, "On potential enhancements for low altitude aerial vehicles", R1-1708294, 3GPP TSG-RAN WG1 #89, May 19, 2017, pp. *****.
Qualcomm Incorporated, Identification and certification of Aerial Vehicles, 3GPP TSG-RAN WG2 Meeting #99, R2-1708238, pp. 1-6, Aug. 21-25, 2017, Berlin, Germany.
Huawei, HiSilicon, Potential enhancements for drones in idle state, 3GPP TSG-RAN WG2 Meeting #99, R2-1708542, pp. 1-3, Aug. 21-25, 2017, Berlin, Germany.

* cited by examiner

CELL BAR METHOD AND APPARATUS

TECHNICAL FIELD

The present disclosure is directed to wireless communication technology, and more particularly relates to the cell bar technology in wireless communication.

BACKGROUND

In recent years, aerial vehicles, such as drones are becoming more and more popular. For example, more and more drones are commercially used in package delivery, search-and-rescue, monitoring of critical infrastructure, wildlife conservation, flying cameras, and surveillance. 3GPP (3rd Generation Partnership Project) observes this trend and is interested in introducing aerial vehicles, such as drones, into the wireless network like UEs (User Equipment), i.e., aerial UEs. Consequently, a new study item (SI) "Study on enhanced LTE Support for Aerial Vehicles" was approved by TSG RAN #75.

In a Long Term Evolution (LTE)/LTE-Advanced (LTE-A) system, cell bar is used to avoid network overload when a network is in congestion or in special scenarios, for example, in a disaster scenario, by preventing UEs from initiating RRC (Radio Resource Control) connection establishment. Networks may broadcast parameters associated with cell bar and UEs may evaluate whether the cell is barred according to these parameter and RRC connection purpose. However, the current cell bar scheme for conventional UEs, i.e., terrestrial UEs, are not adaptive to aerial UEs at least for the following reasons: one is that aerial UEs may consume more radio resources than terrestrial UEs on the same traffic according to aerial field test, and another is that different services of aerial UEs may require different radio resources. In fact, the current cell bar scheme even cannot distinguish aerial UEs from terrestrial UEs, and thus cannot realize different cell bar strategies for aerial UEs and terrestrial UEs respectively.

Thus, there is a need for providing a cell bar mechanism for aerial UEs.

SUMMARY OF THE DISCLOSURE

One object of the disclosure is to provide a technical solution for the aerial cell bar for aerial UEs in a wireless network.

According to an embodiment of the disclosure, a method includes: determining whether a cell supports aerial service; broadcasting conventional cell bar parameters associated with the cell; and broadcasting aerial cell bar parameters associated with the cell when the cell supports aerial service.

In an embodiment of the disclosure, the aerial cell bar parameters may include at least one threshold for determining whether an aerial user equipment (UE) will be subjected to an aerial cell bar scheme. The at least one threshold may include a height threshold for determining an airborne state. In another embodiment of the disclosure, the at least one threshold may include a threshold of detected cell number and a reference signal receiving power (RSRP) threshold for detecting cells. The aerial cell bar parameters may further include a plurality of service types, a plurality of bar factors and a plurality of bar times, wherein each bar factor and each bar time are associated with each service type. The plurality of service types may be broadcasted in a bitmap. In an embodiment of the disclosure, the method may further include broadcasting a neighbor cell list for airborne UEs, or further include broadcasting a neighbor cell list for airborne UEs and a neighbor cell list for conventional UEs.

According to another embodiment of the disclosure, a method may include: receiving conventional cell bar parameters associated with a cell; receiving aerial cell bar parameters associated with the cell; and determining whether an aerial UE will be subjected to an aerial cell bar scheme supported by the cell.

In an embodiment of the disclosure, the aerial cell bar parameters may be broadcasted in broadcasting information. Determining whether an aerial UE is subjected to an aerial cell bar scheme supported by the cell may be based on a stored state. When the stored state is an airborne state, the aerial UE will be subjected to the aerial cell bar scheme. In another embodiment of the disclosure, determining whether an aerial UE will be subjected to an aerial cell bar scheme supported by cell may be based on the at least one threshold. The at least one threshold may include a height threshold for determining an airborne state. When the height of the aerial UE is higher than the height threshold, the aerial UE will be subjected to the aerial cell bar scheme. The at least one threshold may include a threshold of detected cell number and an RSRP threshold for detecting cells. When the RSRP associated with a cell is larger than the RSRP threshold for detecting cells, the cell is detected by the aerial UE. When the number of detected cells is larger than the threshold of detected cell number, the aerial UE may be subjected to the aerial cell bar scheme. In an embodiment of the disclosure, the method may further include mapping a service type of the aerial UE to one of the plurality of service types and selecting the bar factor and bar time associated with the mapped service type. In another embodiment of the disclosure, the method may further include evaluating a cell bar status. In a further embodiment of the disclosure, the method may include receiving a neighbor cell list for airborne UEs, or may include receiving a neighbor cell list for airborne UEs and a neighbor cell list for conventional UEs. The method may further include automatically acquiring CGI information cgi-info for a measured cell that is not in the received neighbor cell list for airborne UEs by the aerial UE.

Embodiments of the disclosure also provide apparatuses, which can perform the above methods.

For example, in an embodiment of the disclosure, an apparatus may include a processor that determines whether a cell supports aerial service and a transmitter coupled to the processor. The transmitter may broadcast conventional cell bar parameters associated with the cell; and broadcast aerial cell bar parameters associated with the cell when the cell supports aerial service.

In another embodiment of the disclosure, an apparatus may include a receiver and a processor coupled to the receiver. The receiver may receive conventional cell bar parameters associated with a cell; and receive aerial cell bar parameters associated with the cell. The processor may determine whether an aerial UE will be subjected to an aerial cell bar scheme supported by the cell.

Embodiments of the disclosure solve the technical problem concerning cell bar scheme for aerial UEs, and thus can facilitate introducing aerial vehicles into wireless networks as aerial UEs.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

Figure 1:
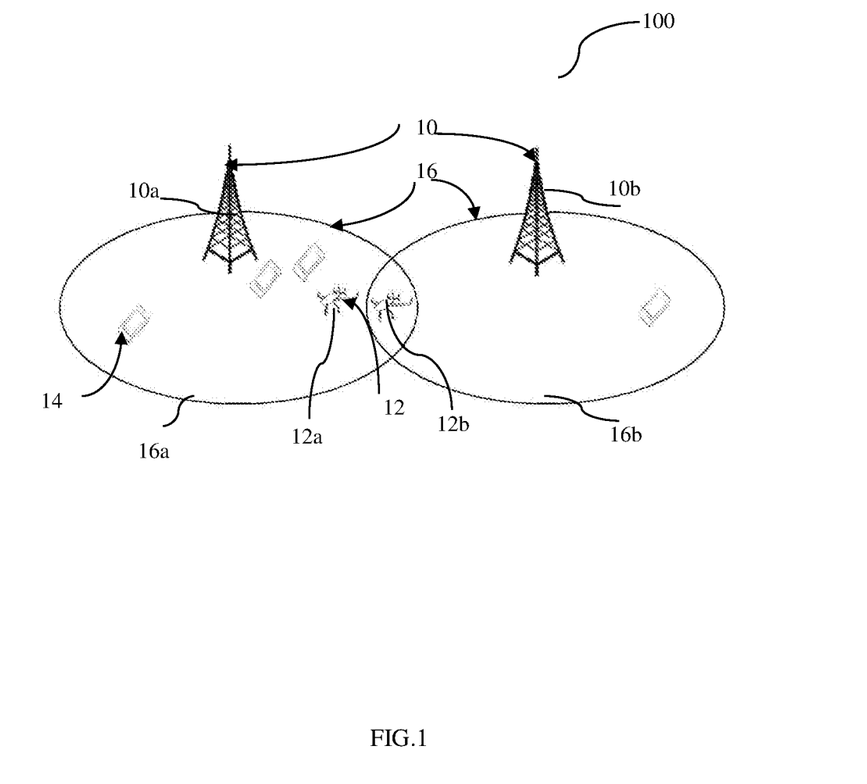
FIG. 1 depicts a wireless communication system with aerial UEs according to an embodiment of the disclosure.

FIG. 1 depicts a wireless communication system 100 with aerial UEs according to an embodiment of the disclosure.

As shown in FIG. 1, the wireless communication system 100 includes a plurality of base stations 10 including base station 10a, 10b, a plurality of aerial UEs 12 including UE 12a and UE 12b and a plurality of conventional UEs 14, i.e., terrestrial UEs. The plurality of base stations 10 may be based on LTE/LTE-A or not. For example, the plurality of base stations 10 may be a plurality of eNBs, or a plurality of gNBs. In one embodiment of the disclosure, the plurality of base stations 10 may be controlled by a control unit (not shown). Each base station 10 may define one or more cells 16, and each cell 16 may support aerial service or not. The cell 16 supporting aerial service may support aerial cell bar schemes and/or conventional cell bar schemes, while the cell 16 not supporting aerial service may only support conventional cell bar schemes. The plurality of aerial UEs 12 may be a plurality of drones or other aerial vehicles. The conventional UEs 14 may be computing devices, wearable devices, and mobile devices, etc. Specifically, as shown in FIG. 1, UEs 12a and 12b are aerial UEs 12, while the other UEs are conventional UEs 14. UEs 12a and 12b are both in cell 16a defined by base station 10a. At the same time, UE 12b is also in the edge of cell 16b defined by the base station 10b, that is, UE 12b is simultaneously in cell 16a and cell 16b. Persons skilled in the art should understand that as the 3GPP and electronic technology develop, the terminologies recited in the specification may change, which should not affect the principle of the disclosure.

For the plurality of aerial UEs 12, even if they fly in a low-altitude airspace, the quality of the link between an aerial UE 12 and its corresponding base station 10 is not as good as that of the link between a conventional UE 14 and its corresponding base station 10. For example, when UE 12a is flying in the altitude around 40 m~120 m, the SINR (Signal to Interference plus Noise Ratio) of the link between UE 12a and base station 10a is mainly in the range from −5 dB to 5 dB. However, for the same type link between a conventional UE 14 and the same base station 10a, the SINR of the link can be higher than 25 dB. That is, the aerial UEs 12 may consume more radio resources than the conventional UEs 14 for the same traffic. Thus, the wireless communication system 100 according to an embodiment of the disclosure provides a separated aerial cell bar mechanism for the aerial UEs 12 different from conventional UEs 14.

According to an embodiment of the disclosure, for a cell 16 supporting aerial service, the network side, for example, the base station 10 or a control unit defining the cell 16, may broadcast aerial cell bar parameters, which may indicate service types, and bar factors and bar times associated with the service types etc. When an aerial UE 12 in an airborne state initiates or resumes a RRC connection with the base station 10 in the cell 16, the aerial UE 12 may determine whether to subject itself to an aerial cell bar scheme based on the broadcasted aerial cell bar parameters.

Figure 2:
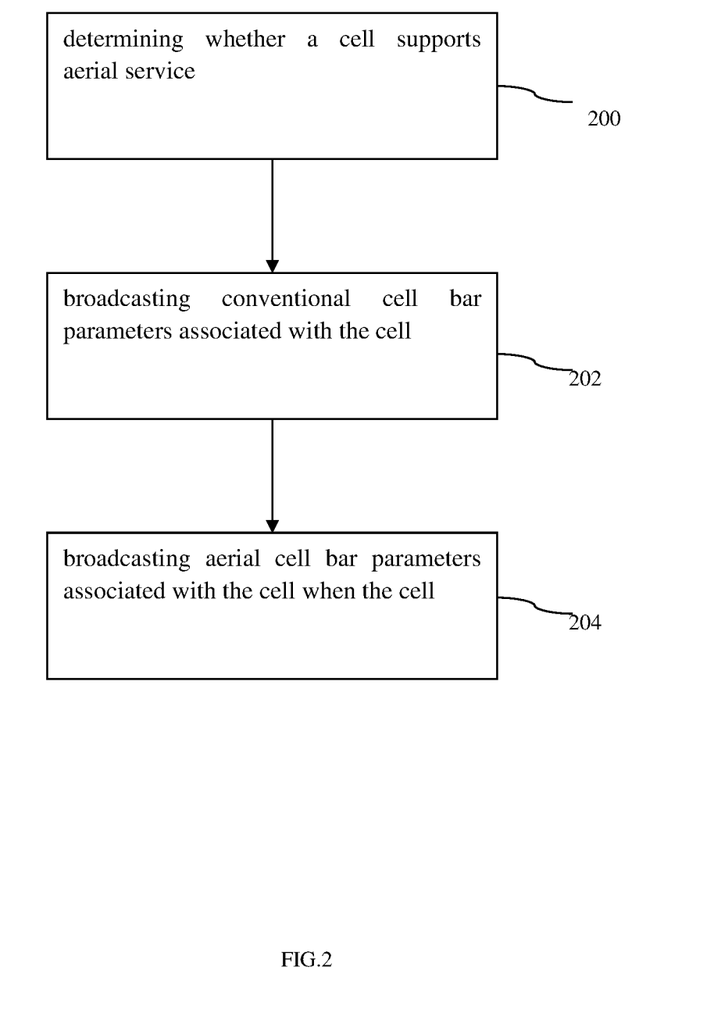
FIG. 2 is a flow chart illustrating a method of performing aerial cell bar according to an embodiment of the disclosure.

FIG. 2 is a flow chart illustrating a method of performing aerial cell bar according to an embodiment of the disclosure.

Specifically, the method of performing aerial cell bar according to an embodiment of the disclosure may be performed by a base station 10 or a control unit controlling the base station 10. As shown in FIG. 2, in step 200, whether a cell 16 supports aerial service is determined. For example, when the base station 10a initiates cell 16a, the base station 10a may determine whether cell 16a supports aerial service. In step 202, conventional cell bar parameters associated with the cell 16, for example, cell 16a, may be broadcasted in the wireless communication system 100. In addition, for the cell 16 supporting aerial service, in step 204, aerial cell bar parameters associated with the cell 16 may be broadcasted. For example, in an embodiment of the disclosure, for cell 16a, in addition to the conventional cell bar parameters, the base station 10a may broadcast the aerial cell bar parameters to all aerial UEs 14 and all conventional UEs 16. The aerial cell bar parameters can be broadcasted in broadcasting information, such as a SIB (System information Block), which may be a conventional SIB, for example, SIB2, or a newly defined SIB for aerial service. For persons skilled in the art, although each step of the method is numbered in sequence, they should understand that does not mean the method is operated in the same sequence. The steps are numbered only for clearly illustrating the principle of the disclosure.

In an embodiment of the disclosure, the aerial cell bar parameters may include at least one threshold for determining whether an aerial UE 12 may be subjected to an aerial cell bar scheme. The at least one threshold may include a height threshold for determining an airborne state. When an aerial UE 12 is in a height higher the height threshold, the aerial UE 12 may determine itself to be in an airborne state, and determine to subject itself to the aerial cell bar scheme. In an embodiment of the disclosure, the at least one threshold may include a threshold of detected cell numbers and an RSRP threshold for detecting cells. When the RSRP of a cell 16 measured by an aerial UE 12 is higher than the RSRP threshold for detecting cells, the cell is detected by the aerial UE 12. For an aerial UE 12 flying in the air, it usually detects more cells than a conventional UE 14 due to the altitude. When the number of cells detected by an aerial UE 12 is larger than the threshold of detected cell numbers, the aerial UE 12 may determine itself to be in an airborne state, and determine to subject itself to the aerial cell bar scheme.

According to an embodiment of the disclosure, the aerial cell bar parameters may include a plurality of service types, a plurality of bar factors and a plurality of bar times, wherein each bar factor and each bar time are associated with each service type. That is, for each service type, a bar factor and bar time are defined. The plurality of service types may be broadcasted in a bitmap. Each service type is used to indicate a cell bar scheme associated with a service type of an aerial UE. For example, one service type may indicate a cell bar scheme used for command or control service, while another service type may indicate a cell bar used for video service. The bar factor indicates a value in a range from 0 to 1, which varies with the service type for barring cells according to different services of the aerial UEs. For example, although control and command services are essential to the aerial UEs, it does not consume much radio resources even if link quality is not so good because the traffic is not heavy. Accordingly, for control or command service of an aerial UE 12, the bar factor may be low, such as 0.1. However, for video service of an aerial UE 12, it may not be as essential as control and command services, but it may consume much radio resource due to large traffic. Accordingly, for video service of an aerial UE 12, the bar factor may be high, such as 0.8. The bar time indicates a value used for cell bar time calculation for a service of the aerial UE 12. For example, for a control service, the bar time may be 5 minutes. When the aerial UE 12 determines to subject itself to an aerial cell bar scheme, it will bar the cell 16 and then try to initiate a RRC connection with the cell 16 again after the time calculated based on 5 minutes. Detailed calculation manner will be illustrated in the following text.

Considering the handover among different cells for aerial UEs 12, in an embodiment of the disclosure, a neighbor cell list for airborne UEs, i.e., the aerial UEs 12 in an airborne state is broadcasted, for example, by the base station 10. In another embodiment of the disclosure, a neighbor cell list for conventional UEs is also broadcasted in addition to the neighbor cell list for airborne UEs.

Corresponding to the network side supporting aerial cell bar, according to an embodiment of the disclosure, when an aerial UE 12 tries to initiate or resume a RRC connection in a cell 16, it may determine whether the cell is barred through an exemplified method of performing aerial cell bar of the disclosure.

Figure 3:
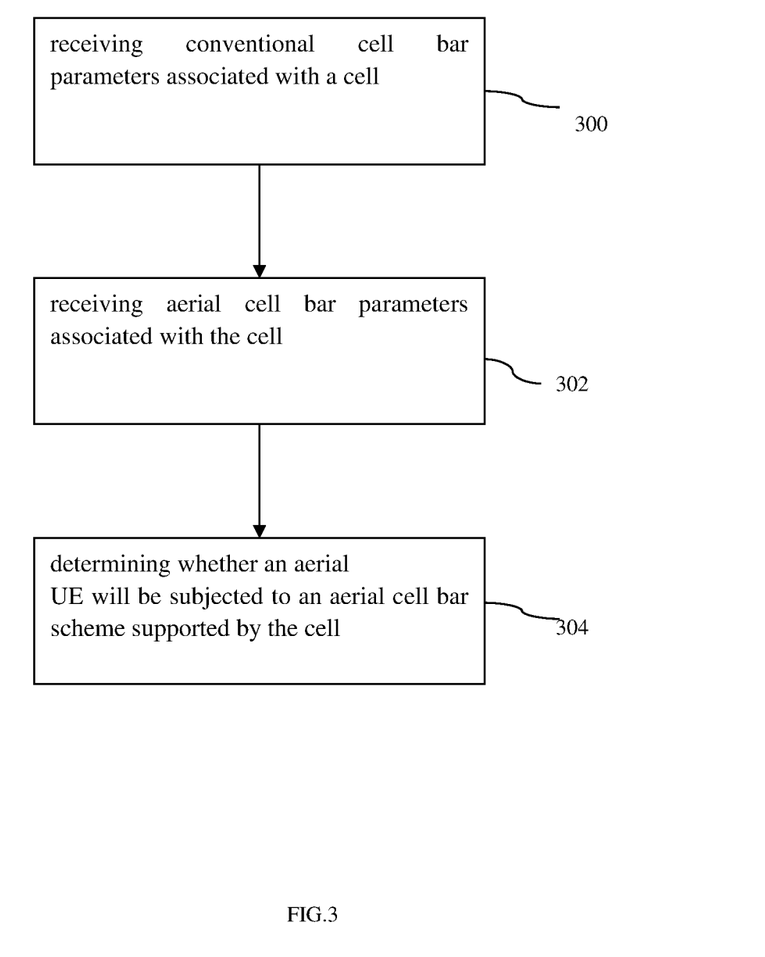
FIG. 3 is a flow chart illustrating a method of performing aerial cell bar according to an embodiment of the disclosure.

FIG. 3 is a flow chart illustrating a method of performing aerial cell bar according to an embodiment of the disclosure. Similarly, for persons skilled in the art, although each step of the method is numbered in sequence in FIG. 3, they should understand that does not mean the method is operated in the same sequence. The steps are numbered only for clearly illustrating the principle of the disclosure.

Specifically, the method of performing aerial cell bar according to an embodiment of the disclosure may be performed by an aerial UE 12, for example, a drone, when it initiates or resumes a RRC connection. As shown in FIG. 3, in step 300, conventional cell bar parameters associated with a cell 16 are received. For example, conventional cell bar parameters associated with cell 16*a* broadcasted by the base station 10*a* in the network via SIB are received by UE 12*a*. In step 302, aerial cell bar parameters associated with the cell 16 are received. For example, aerial cell bar parameters associated with cell 16*a* broadcasted by the base station 10*a* via SIB are also received by UE 12*a*. In step 304, whether an aerial UE 12 may be subjected to an aerial cell bar scheme supported by the cell may be determined. For example, UE 12*a* may determine whether to subject itself to an aerial cell bar scheme supported by cell 16*a* based on received aerial cell bar parameters associated with cell 16*a*. More details about the process of determining whether an aerial UE 12 may be subjected to an aerial cell bar scheme supported by the cell 16 may be recited as follows combining with various embodiments of the disclosure.

In an embodiment of the disclosure, an aerial UE 12, for example, UE 12*a*, may determine whether to subject itself to an aerial cell bar scheme when it requests an establishment or resuming of an RRC connection while the aerial UE 12 is in RRC_IDLE. The aerial UE 12 may make the decision based on a stored state. For example, when UE 12*a* initiates a RRC connection with cell 16*a* and learns that its stored state is an airborne state, UE 12*a* may subject itself to an aerial cell bar scheme provided for cell 16*a*. Otherwise, UE 12*a* may subject itself to a conventional cell bar scheme.

According an embodiment of the disclosure, when the received aerial cell bar parameters include at least one threshold, an aerial UE 12, for example, UE 12*a*, may determine whether to subject itself to an aerial cell bar scheme based on the at least one threshold. For example, when the at least one threshold includes a height threshold for determining an airborne state, and the height of the aerial UE 12 is higher than the height threshold, the aerial UE 12 may subject itself to the aerial cell bar scheme. Specifically, regarding UE 12*a* in an embodiment of the disclosure, when the height threshold is 40 m and UE 12*a* is in the altitude of 50 m, that is, the height of UE 12*a* is higher than the height threshold, UE 12*a* may determine to subject itself to the aerial cell bar scheme. On the other hand, when the height threshold is 40 m and UE 12*a* is in the altitude of 30 m, that is, the height of UE 12*a* is lower than the height threshold, UE 12*a* may determine to subject itself to the conventional cell bar scheme. In another example, the at least one threshold may include a threshold of detected cell number and an RSRP threshold for detecting cells. When the RSRP associated with a cell is larger than the RSRP threshold for detecting cells, the cell is detected by the aerial UE. When the number of detected cells is larger than the threshold of detected cell number, the aerial UE may be subjected to the aerial cell bar scheme. Specifically, regarding UE 12*a* in an embodiment of the disclosure, the received threshold of detected cell number may be 3 and the received RSRP threshold for detecting cells may be −100 dbm. When the RSRP of a cell 16, for example, cell 16*a*, is −80 dbm, the cell 16 is regarded as being detected by UE 12*a*. When the RSRP of a cell 16 is −110 dbm, the cell 16 is regarded as not being detected by UE 12*a*. When UE 12*a* detects 5 cells in total, UE 12*a* may subject itself to the aerial cell bar scheme. Otherwise, when UE 12*a* detects 2 cells in total, UE 12*a* may not subject itself to the aerial cell bar scheme and instead subject itself to the conventional cell bar scheme.

In an embodiment of the disclosure, the received aerial cell bar parameters may include a plurality of service types, and a plurality of bar factors and bar times associated with the plurality of service types. The method of performing aerial cell bar may further include mapping a service type of the aerial UE 12 to one of the plurality of service types and selecting the bar factor and bar time associated with the mapped service type. For example, the received aerial cell bar parameters indicate that the bar factor associated with control and command service of an aerial UE 12 is 0.2 and the bar time associated with the control and command service is 2 minutes, while the bar factor associated with video service of an aerial UE 12 is 0.9 and the bar time associated with the video service is 30 minutes. When an aerial UE 12, for example, UE 12*a*, initiates a RRC connection for control service with the cell 16, for example, cell 16*a*, UE 12*a* may map the control service to one of the plurality of service types of received aerial cell bar parameters, and select the bar factor and bar time of control service listed in the received aerial cell bar parameters.

According to an embodiment of the disclosure, the method of performing aerial cell bar may further include evaluating an aerial cell bar status. An exemplified method of evaluating an aerial cell bar status is illustrated in FIG. 4.

Figure 4:
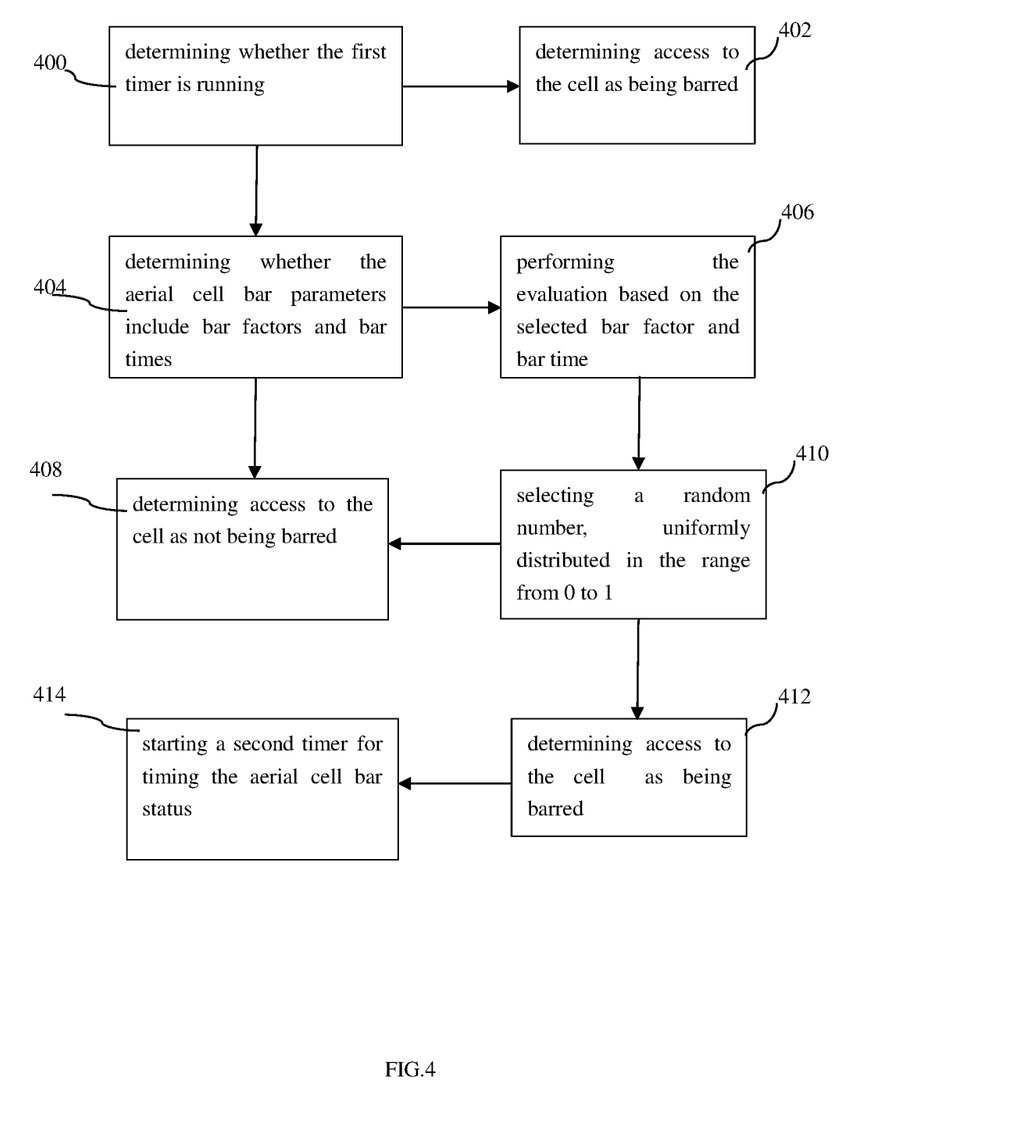
FIG. 4 illustrates a method of evaluating an aerial cell bar status according to an embodiment of the disclosure.

As shown in FIG. 4, in step 400, the aerial UE 12 may determine whether the first timer is running, which is initiated when the aerial UE 12 receives a signal that the cell 16 refuses a RRC connection requested by the aerial UE 12. When the first timer is running, the aerial UE 12 may determine access to the cell 16 as being barred in step 402. Otherwise, in step 404 the aerial UE 12 may perform the evaluation based on whether the aerial cell bar parameters include bar factors and bar times. When the aerial cell bar parameters include bar factors and bar times, the aerial UE 12 may perform the evaluation based on the selected bar factor and bar time in step 406. Otherwise, in step 408, the aerial UE 12 may determine access to the cell 16 as not being barred. In step 410, when the aerial UE 12 performs the evaluation based on the selected bar factor and bar time, the aerial UE 12 may select a random number, which may be marked as 'rand', uniformly distributed in the range as the same as that of the bar factor, i.e., from 0 to 1. When the random number is lower than the value of the bar factor indicated in aerial cell bar parameters, the aerial UE 12 may determine access to the cell 16 as not being barred. Otherwise, in step 412, the aerial UE 12 may determine access to the cell 16 as being barred. When the aerial UE 12 determines access to the cell 16 as being barred while the first timer is not running, the aerial UE 12 may start a second timer in step 414, which may be marked as "Tbarring." The aerial UE 12 may select a new random number 'rand' uniformly distributed in the range from 0 to 1 and calculate the value of the second timer by the selected random number and selected bar time, which may be marked as "bartime" as follows:

"Tbarring"=(0.7+0.6* rand) * bartime.

In an embodiment of the disclosure, the method of performing aerial cell bar further includes receiving the neighbor cell list for airborne UEs and the neighbor cell list for conventional UEs, for example, by the aerial UEs 12. When the cell measured by the aerial UE 12 is not in the received neighbor cell list for airborne UEs, the aerial UE 12 may automatically acquire CGI information cgi-info for the measured cell that is not in the received neighbor cell list for airborne UEs. The cgi-info includes cellGlobalId, trackingAreaCode and plmn-IdentityList, which are known for persons skilled in the art.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

Figure 5:
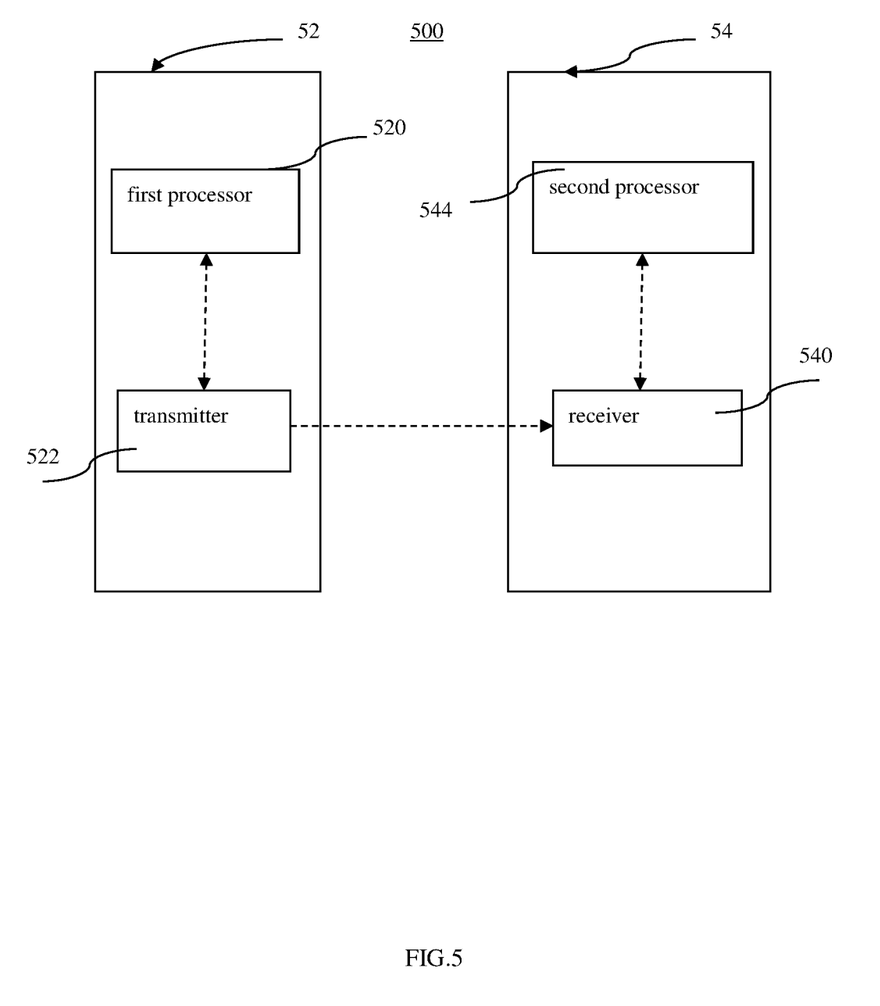
FIG. 5 illustrates a block diagram of a system of performing aerial cell bar according to an embodiment of the disclosure.

For example, FIG. 5 illustrates a block diagram of a system 500 of performing aerial cell bar according to an embodiment of the disclosure, which includes a first apparatus 52 of performing aerial cell bar in the network side and a second apparatus 54 of performing aerial cell bar in the terminal side. The first apparatus 52 may be a base station 10 or a control unit, or other apparatus that can execute the method of performing aerial cell bar in the network side, such as that illustrated in FIG. 2. The second apparatus 54 may be an aerial UE 12, or other apparatus that can execute the method of performing aerial cell bar in the terminal side, such as that illustrated in FIG. 3.

Specifically, as shown in FIG. 5, the first apparatus 52 may include a first processor 520 that determines whether a cell 16 supports aerial service, and a transmitter 522 coupled to the first processor 520. The transmitter 522 may broadcast conventional cell bar parameters associated with the cell 16, and broadcast aerial cell bar parameters associated with the cell 16 when the cell 16 supports aerial service.

In an embodiment of the disclosure, the aerial cell bar parameters may include at least one threshold for determining whether an aerial UE 12 may be subjected to an aerial cell bar scheme. The at least one threshold may include a height threshold for determining an airborne state according to an embodiment of the disclosure. In an embodiment of the disclosure, the at least one threshold may include a threshold of detected cell numbers and an RSRP threshold for detecting cells. According to an embodiment of the disclosure, the aerial cell bar parameters may include a plurality of service types, a plurality of bar factors and a plurality of bar times, wherein each bar factor and each bar time are associated with each service type. That is, for each service type, a bar factor and bar time are defined. The plurality of service types may be broadcasted in a bitmap.

In an embodiment of the disclosure, the transmitter 522 may broadcast a neighbor cell list for airborne UEs. In another embodiment of the disclosure, the transmitter 522 may further broadcast a neighbor cell list for conventional UEs in addition to the neighbor cell list for airborne UEs.

The second apparatus 54 in an embodiment of the disclosure may receive the signal and/or information transmitted/broadcasted by the first apparatus 52. The second apparatus 54 may include a receiver 540 and a second processor 542 coupled to the receiver 540. The receiver 540 may receive conventional cell bar parameters associated with a cell 16 broadcasted by the transmitter 522 and receive aerial cell bar parameters associated with the cell 16 broadcasted by the transmitter 522. The second processor 544 may determine whether the aerial UE 12 will be subjected to an aerial cell bar scheme supported by the cell 16.

The second processor 544 in an embodiment of the disclosure may determine whether an aerial UE 12 will be subjected to an aerial cell bar scheme based on a stored state, and when the stored state is an airborne state, the aerial UE 12 will be subjected to the aerial cell bar scheme.

In an embodiment of the disclosure, the aerial cell bar parameters received by the receiver 540 may comprise at least one threshold, and the second processor 544 may determine whether the aerial UE 12 will be subjected to an aerial cell bar scheme based on the at least one threshold. For example, the at least one threshold may include a height threshold for determining an airborne state. When the height of the aerial UE 12 is higher than the height threshold, the second processor 544 may determine to subject the aerial UE 12 to the aerial cell bar scheme. In an embodiment of the disclosure, the received at least one threshold may include a threshold of detected cell number and an RSRP threshold for detecting cells. When the RSRP associated with a cell is larger than the RSRP threshold for detecting cells, the cell is detected by the aerial UE 12. When the number of detected cells is larger than the threshold of detected cell number, the second processor 544 may determine to subject the aerial UE 12 to the aerial cell bar scheme. When the aerial cell bar parameters received by the receiver 540 include service types, and bar factors and bar times associated with the service types, the second processor 544 in an embodiment of the disclosure may map a service type of the aerial UE 12 to one of the plurality of service types and select the bar factor and bar time associated with the mapped service type.

According to an embodiment of the disclosure, the second processor 544 may further evaluate an aerial cell bar status. For example, when the first timer is running, which is initiated when the aerial UE 12 receives a signal that the cell 16 refuses a RRC connection requested by the aerial UE 12, the second processor 544 may determine access to the cell 16 as being barred. Otherwise, the second processor 544 may perform the evaluation based on whether the aerial cell bar parameters include bar factors and bar times. When the aerial cell bar parameters include bar factors and bar times, the second processor 544 may perform the evaluation based on the selected bar factor and bar time. Otherwise, the second processor 544 may determine access to the cell 16 as not being barred. When the second processor 544 performs the evaluation based on the selected bar factor and bar time, the second processor 544 may select a random number, which may be marked as 'rand', uniformly distributed in the range as the same as that of the bar factor, i.e., from 0 to 1. When the random number is lower than the value of the bar factor indicated in aerial cell bar parameters, the second processor 544 may determine access to the cell 16 as not being barred, Otherwise, the second processor 544 may determine access to the cell 16 as being barred. When the second processor 544 determines access to the cell 16 as being barred while the first timer is not running, the second processor 544 may start a second timer. The second processor 544 may select a new random number 'rand' uniformly distributed in the range from 0 to 1 and calculate the value of the second tinier based on the selected random number and selected bar time.

In an embodiment of the disclosure, the receiver 540 may further receive the neighbor cell list for airborne UEs transmitted by the transmitter 522 or simultaneously receive the neighbor cell list for conventional UEs transmitted by the transmitter 522. For the cell 16 measured by the aerial UE 12, the second processor 544 may automatically acquire CGI information cgi-info for a measured cell that is not in the received neighbor cell list for airborne UEs.

Embodiments of the disclosure define aerial cell bar schemes and associated aerial cell bar parameters, so that the wireless network can use different cell bar strategies for aerial UEs and conventional UEs in view of different application scenarios. In addition, embodiments of the disclosure define aerial UEs' operation to determine aerial cell bar status according to received aerial cell bar parameters. More specifically, embodiments of the disclosure define an aerial UE determines the conditions in which the aerial UE subjects itself to an aerial cell bar scheme, how to use parameters associated with service types and how to evaluate aerial cell bar status. In conclusion, embodiments of the disclosure solve the technical problem of aerial cell bar, and can facilitate the development and application of wireless network covering aerial UEs.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed:

1. A method, comprising:
   determining whether a cell supports aerial service;
   broadcasting conventional cell bar parameters associated with the cell; and
   broadcasting aerial cell bar parameters associated with the cell when the cell supports aerial service.

2. The method according to claim 1, wherein the aerial cell bar parameters comprise at least one threshold for determining whether an aerial user equipment (UE) will be subjected to an aerial cell bar scheme.

3. The method according to claim 2, wherein the at least one threshold comprises a height threshold for determining an airborne state.

4. The method according to claim 2, wherein the at least one threshold comprises a threshold of detected cell number and a reference signal receiving power (RSRP) threshold for detecting cells.

5. The method according to claim 1, wherein the aerial cell bar parameters comprise a plurality of service types, a plurality of bar factors and a plurality of bar times, wherein each bar factor and each bar time are associated with each service type.

6. The method according to claim 5, wherein the plurality of service types are broadcasted in a bitmap.

7. The method according to claim 1, further comprising broadcasting a neighbor cell list for airborne UEs.

8. The method according to claim 1, further comprising broadcasting a neighbor cell list for airborne UEs and a neighbor cell list for conventional UEs.

9. A method, comprising:
   receiving conventional cell bar parameters associated with a cell;
   receiving aerial cell bar parameters associated with the cell; and
   determining whether an aerial user equipment (UE) will be subjected to an aerial cell bar scheme supported by the cell.

10. The method according to claim 9, wherein said determining whether an aerial UE will be subjected to an aerial cell bar scheme supported by the cell further comprises determining whether an aerial UE will be subjected to an aerial cell bar scheme based on a stored state, and when the stored state is an airborne state, the aerial UE will be subjected to the aerial cell bar scheme.

11. The method according to claim 9, wherein the aerial cell bar parameters comprise at least one threshold, and said determining whether an aerial UE will be subjected to an aerial cell bar scheme supported by the cell further comprises determining whether an aerial UE will be subjected to an aerial cell bar scheme based on the at least one threshold.

12. The method according to claim 11, wherein the at least one threshold comprises a height threshold for determining an airborne state, and in response to a height of the aerial UE being higher than the height threshold, the aerial UE will be subjected to the aerial cell bar scheme.

13. The method according to claim 11, wherein the at least one threshold comprises a threshold of detected cell number and a reference signal receiving power (RSRP) threshold for detecting cells, wherein when the RSRP associated with a cell is larger than the RSRP threshold for detecting cells, the cell is detected by the aerial UE, and in response to a number of detected cells being larger than the threshold of detected cell number, the aerial UE will be subjected to the aerial cell bar scheme.

14. The method according to claim 9, wherein the aerial cell bar parameters comprise a plurality of service types, a plurality of bar factors and a plurality of bar times, wherein each bar factor and each bar time are associated with each service type, and the method further comprises mapping a service type of the aerial UE to one of the plurality of service types and selecting the bar factor and bar time associated with the mapped service type.

15. The method according to claim 9, wherein the method further comprises evaluating a cell bar status.

16. The method according to claim 14, wherein the plurality of service types are broadcasted in a bitmap.

17. The method according to claim 9, wherein the aerial cell bar parameters are broadcasted in broadcasting information.

18. The method according to claim 9, further comprising receiving a neighbor cell list for airborne UEs.

19. The method according to claim 9, further comprising receiving a neighbor cell list for airborne UEs and a neighbor cell list for conventional UEs.

20. The method according to claim 19, further comprising automatically acquiring CGI information cgi-info for a measured cell that is not in the received neighbor cell list for airborne UEs by the aerial UE.

21. An apparatus, comprising:
a processor that determines whether a cell supports aerial service; and
a transmitter coupled to the processor that:
broadcasts conventional cell bar parameters associated with the cell; and
broadcasts aerial cell bar parameters associated with the cell when the cell supports aerial service.

22. An apparatus, comprising:
a receiver that:
receives conventional cell bar parameters associated with a cell; and
receives aerial cell bar parameters associated with the cell; and
a processor coupled to the receiver that determines whether an aerial user equipment (UE) will be subjected to an aerial cell bar scheme supported by the cell.

* * * * *